US006937420B1

(12) United States Patent
McNab et al.

(10) Patent No.: US 6,937,420 B1
(45) Date of Patent: Aug. 30, 2005

(54) DETERMINING REPEATABLE RUNOUT CANCELLATION INFORMATION USING PES INFORMATION GENERATED DURING SELF SERVO-WRITING OPERATIONS

(75) Inventors: Robert J. McNab, San Jose, CA (US); Hemant Melkote, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/856,658

(22) Filed: May 28, 2004

(51) Int. Cl.[7] .......................... G11B 21/02; G11B 5/596
(52) U.S. Cl. ........................ 360/75; 360/77.04
(58) Field of Search ............... 360/75, 77.04, 360/77.08, 77.11, 77.07, 77.02

(56) References Cited

U.S. PATENT DOCUMENTS 5,668,679 A    9/1997   Swearingen et al.

6,738,205 B1 *   5/2004   Moran et al. ................. 360/17

* cited by examiner

Primary Examiner—Andrew L. Sniezek
(74) Attorney, Agent, or Firm—Robroy R. Fawcett, Esq.

(57) ABSTRACT

Disclosed is a method for generating a repeatable runout (RRO) compensation value set for a circular track on a magnetic medium on a surface of a disk in a disk drive. The magnetic medium has a plurality of previously written spiral servo tracks for providing position information during a self servo-writing operation. In the method, servo burst patterns are written at a plurality of radial locations on the magnetic data storage surface during circular tracking operations using the spiral servo tracks, and respective position error signals generated during the circular tracking operations are stored. The servo burst patterns at the plurality of radial locations define a circular data track. The RRO compensation value set for the circular data track may be generated based on the respective stored position error signals generated during the circular tracking operations for writing the servo burst patterns at the plurality of radial locations.

8 Claims, 5 Drawing Sheets

IDEAL SERVO TRACKS

WRITTEN SERVO TRACKS

DETERMINING REPEATABLE RUNOUT CANCELLATION INFORMATION USING PES INFORMATION GENERATED DURING SELF SERVO-WRITING OPERATIONS

BACKGROUND OF THE INVENTION

1. Field of the Invention

The present invention relates to magnetic disk drives, and more particularly, to generating repeatable runout (RRO) cancellation information during self servowriting of tracks on a rotating magnetic disk medium of a disk drive.

2. Description of the Prior Art and Related Information

With reference to FIGS. 7A and 7B, repeatable runout (RRO) in a disk drive results from imperfections, with respect to a perfect circle, in the location of servo information 34 along a track 26 on a disk surface in the disk drive. During track following, the RRO imperfections have a detrimental effect on efforts by a head-position servo control loop to cause a transducer head to follow a perfect circle. The RRO imperfections are relatively static over time and the effect of the RRO may be attenuated by measuring the RRO and storing resulting RRO cancellation values for later use by the head-position servo loop to compensate for the RRO. However, measuring the RRO may be time consuming and may affect the manufacturing cost the disk drive.

Accordingly, there exists a need for a technique for efficiently determining the RRO cancellation information for reducing the effects of RRO in a disk drive. The present invention satisfies these needs.

SUMMARY OF THE INVENTION

The present invention may be embodied in a method for generating a repeatable runout (RRO) compensation value set for a circular data track on a magnetic medium on a surface of a disk in a disk drive. The magnetic medium has a plurality of previously-written spiral servo tracks for providing position information during a self servo-writing operation. In the method, servo burst patterns are written at a first radial location on the magnetic data storage surface during a circular tracking operation using the spiral servo tracks, and first position error signals generated during the circular tracking operation are stored. Servo burst patterns are written at a second radial location on the magnetic data storage surface during a circular tracking operation using the spiral servo tracks, and second position error signals generated during the circular tracking operation are stored. Servo burst patterns are written at a third radial location on the magnetic data storage surface during a circular tracking operation using the spiral servo tracks, and position error signals generated during the circular tracking operation are stored. Servo burst patterns are written at a fourth radial location on the magnetic data storage surface during a circular tracking operation using the spiral servo tracks, and position error signals generated during the circular tracking operation are stored. The RRO compensation value set for a circular data track, defined by the servo burst patterns at the first, second, third and fourth radial locations, is generated based on the stored first, second, third and fourth position error signals.

In more detailed features of the invention, the RRO compensation value set may be used during a track following operation along the circular data track. Also, the servo burst patterns at the first, second, third and fourth radial locations form a plurality of embedded servo sectors for providing position information during track following along the circular data track. An improved RRO compensation value for each servo sector may be determined based on at least one position error signal determined while track following along the circular data track using the initial RRO compensation value set.

Alternatively, the method may comprise writing servo burst patterns at a plurality of radial locations on the magnetic data storage surface during circular tracking operations using the spiral servo tracks, and storing respective position error signals generated during the circular tracking operations. The servo burst patterns at the plurality of radial locations define a circular data track. The RRO compensation value set for the circular data track may be generated based on the respective stored position error signals generated during the circular tracking operations for writing the servo burst patterns at the plurality of radial locations.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
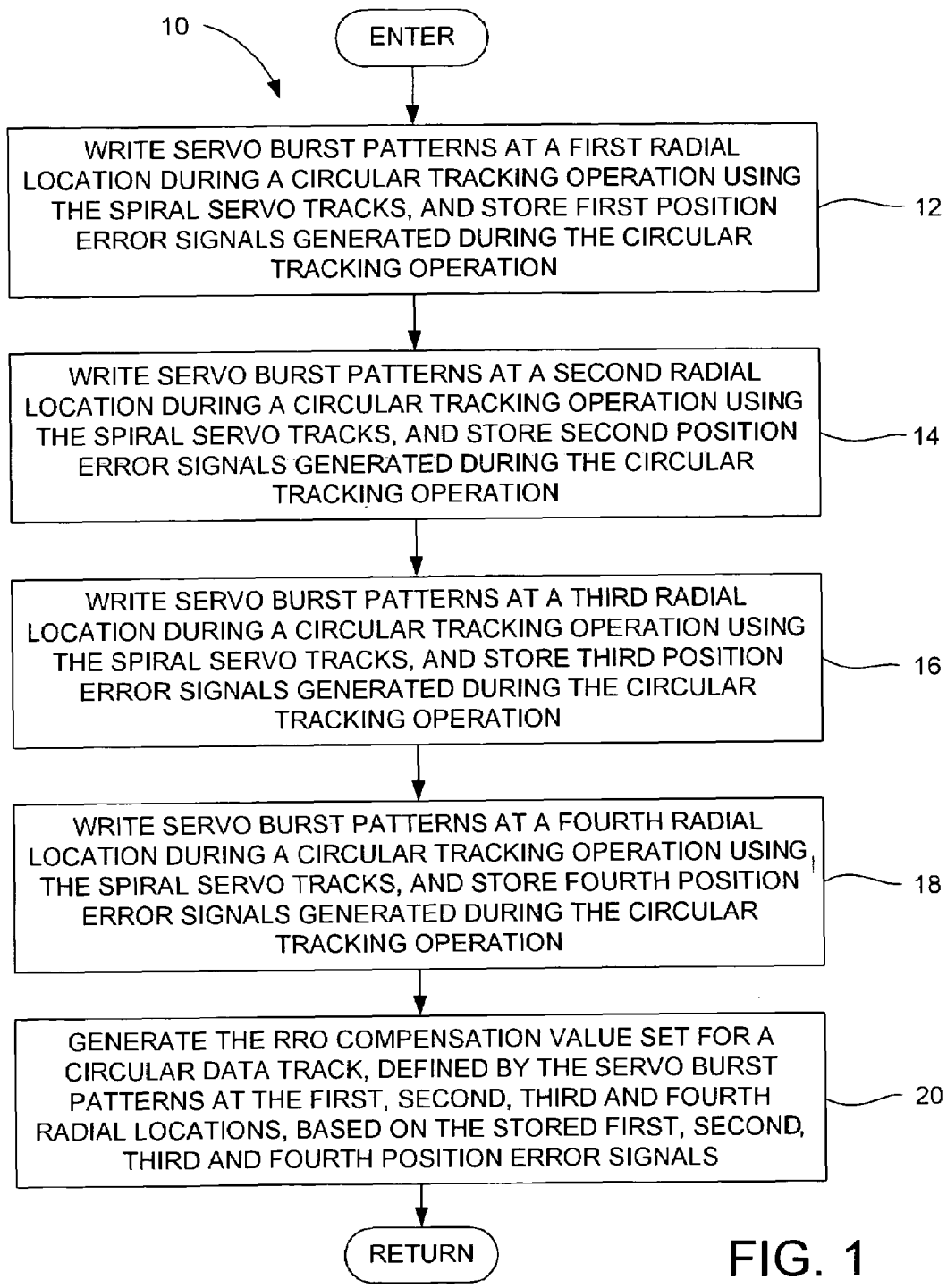
FIG. 1 is a flow chart illustrating a first embodiment of a method for determining repeatable runout (RRO) cancellation information during self servo-writing of tracks in a disk drive, according to the present invention.
Figure 2:
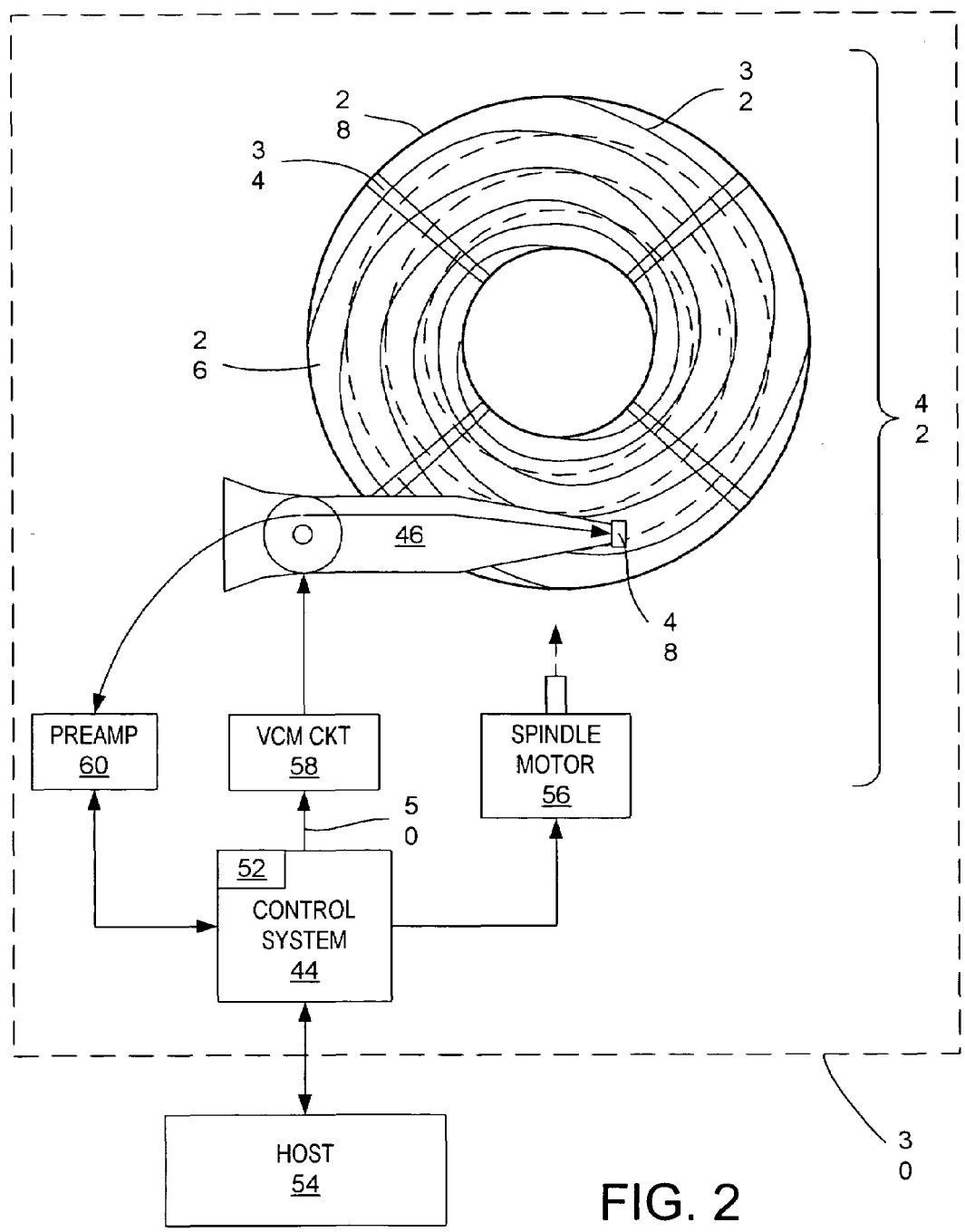
FIG. 2 is a block diagram of a computer system including a disk drive that efficiently determines runout (RRO) cancellation information during self servo-writing operations, according to the present invention.
Figure 3:
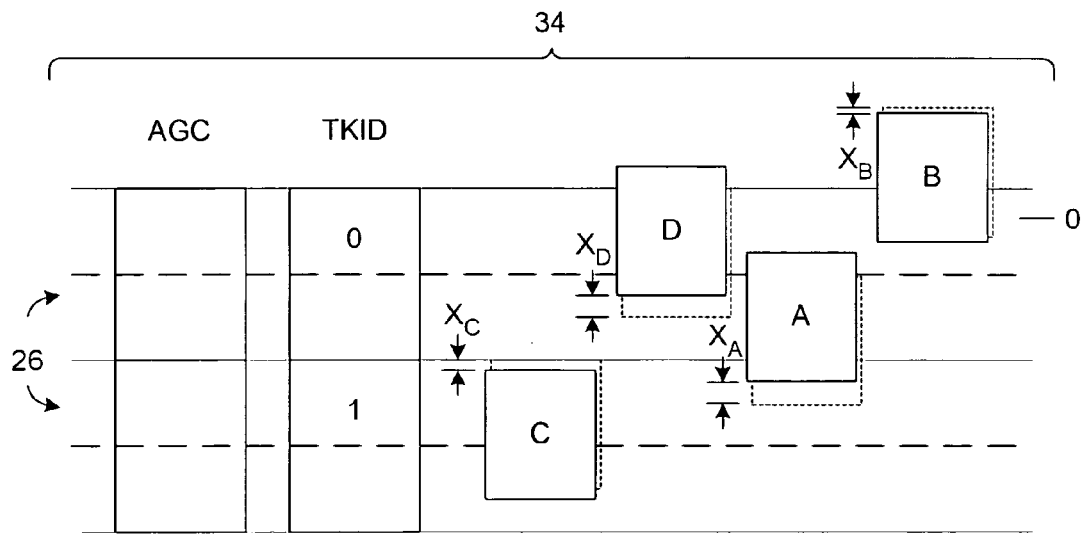
FIG. 3 is a schematic diagram of servo burst patterns for defining a data track.

With reference to FIGS. 1 through 3, the present invention may be embodied in a method 10 for generating a repeatable runout (RRO) compensation value set for a circular data track 26 on a magnetic medium on a surface of a disk 28 in a disk drive 30. The magnetic medium has a plurality of previously-written spiral servo tracks 32 for providing position information during a circular tracking operation. In the method, servo burst patterns A are written at a first radial location on the magnetic data storage surface during a circular tracking operation using the spiral servo tracks 32, and first position error signals generated during the circular tracking operation are stored (step 12). Servo burst patterns B are written at a second radial location on the magnetic data storage surface during a circular tracking operation using the spiral servo tracks 32, and second position error signals generated during the circular tracking operation are stored (step 14). Servo burst patterns C are written at a third radial location on the magnetic data storage surface during a circular tracking operation using the spiral servo tracks 32, and position error signals generated during the circular tracking operation are stored (step 16). Servo burst patterns D are written at a fourth radial location on the magnetic data storage surface during a circular tracking operation using the spiral servo tracks 32, and position error signals generated during the circular tracking operation are stored (step 18). The RRO compensation value set for a circular data track 26, defined by the servo burst patterns at the first, second, third and fourth radial locations, is initially generated based on the stored first, second, third and fourth position error signals (step 20).

The position error signals may be generated from position information determined from the spiral servo tracks 32. Techniques for writing the spiral servo tracks 32, and for determining position information using the spiral servo tracks are disclosed in U.S. Pat. No. 5,668,679, titled SYSTEM FOR SELF-SERVOWRITING A DISK.

The servo burst patterns A, B, C and D, at the first, second, third and fourth radial locations form a plurality of embedded servo sectors 34 for providing position information during track following along the circular data track 26. The order, position, size and labels of the servo bursts may be changed in accordance with convention and desired disk drive design. The embedded servo sectors 34 also may have an automatic gain control (AGC) field and a track identification (TKID) field. An improved RRO compensation value for each servo sector 34 may be determined based on at least one position error signal determined while track following along the circular data track using the initial RRO compensation value set.

Figure 7A:
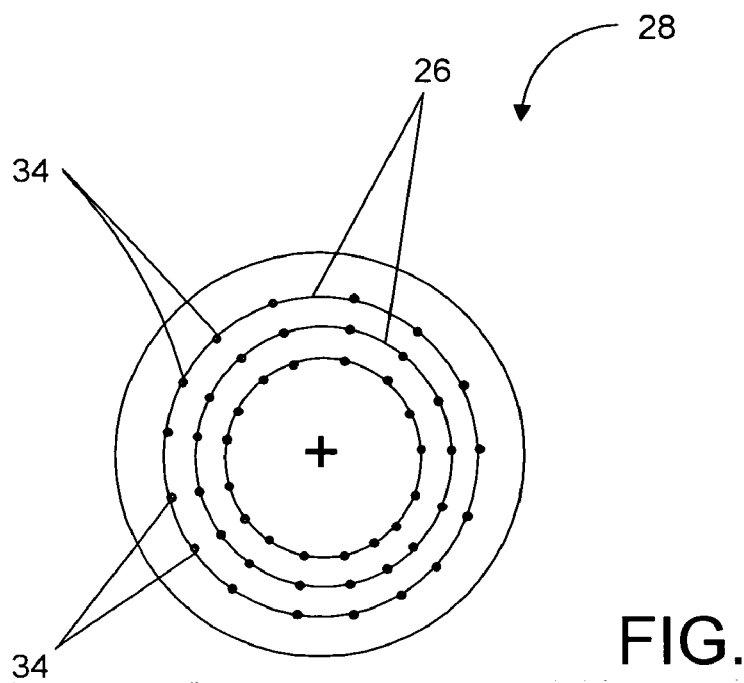
FIG. 7A is a schematic diagram illustrating ideal servo tracks on a disk of a disk drive.
Figure 7B:
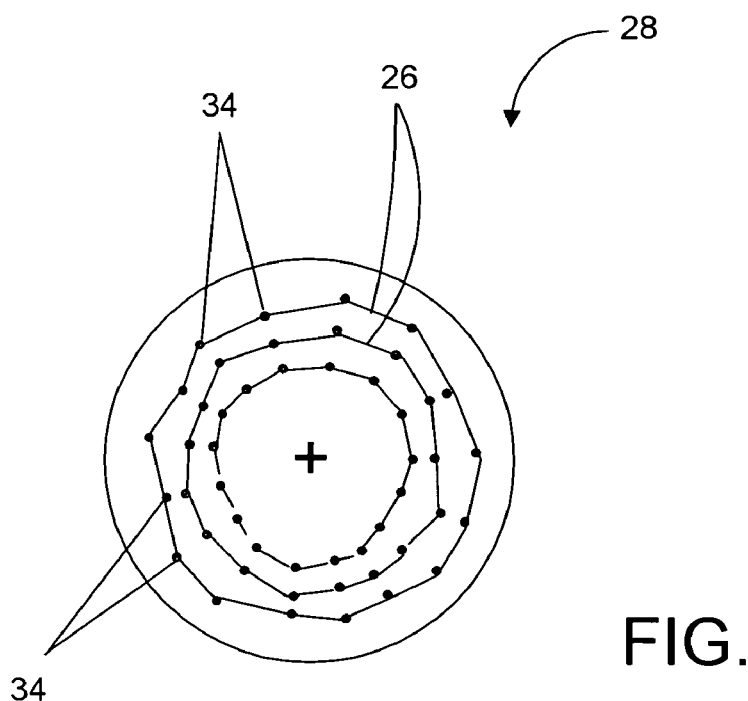
FIG. 7B is a schematic diagram illustrating written servo tracks exhibiting servo RRO.

An ideal position of a burst is shown in FIG. 3 as a dotted line above or below each burst. The difference between the burst's ideal position and the burst's actual position is the burst position error $X_i$. The burst position error contributes to the servo RRO. The RRO imperfections in the servo wedge position information may constitute nearly 50% of total position error signal (PES) variance in a disk drive 30 having high track pitch. Cancellation of the RRO is desired to improve drive performance and achieve higher track densities. With reference again to FIGS. 7A and 7B, an ideal track 26 (FIG. 7A) is one that forms a perfect circle on the disk 28. In an actual track 26 (FIG. 7B), the servo information 34 includes servo bursts that are placed at locations that may deviate outwardly or inwardly from the ideal "center line" of the track circle.

Figure 4:
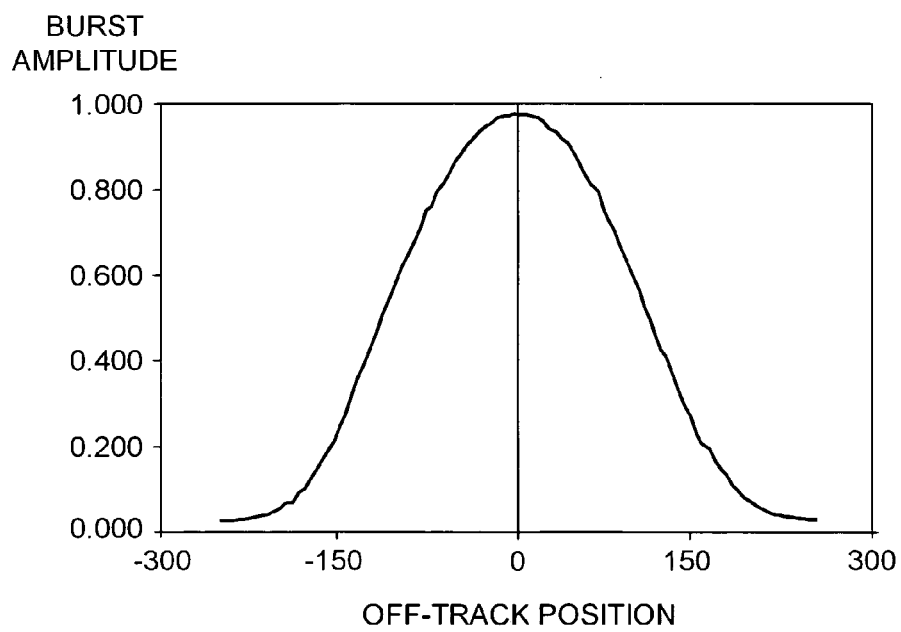
FIG. 4 is a graph of servo burst amplitude versus off-track position.
Figure 5:
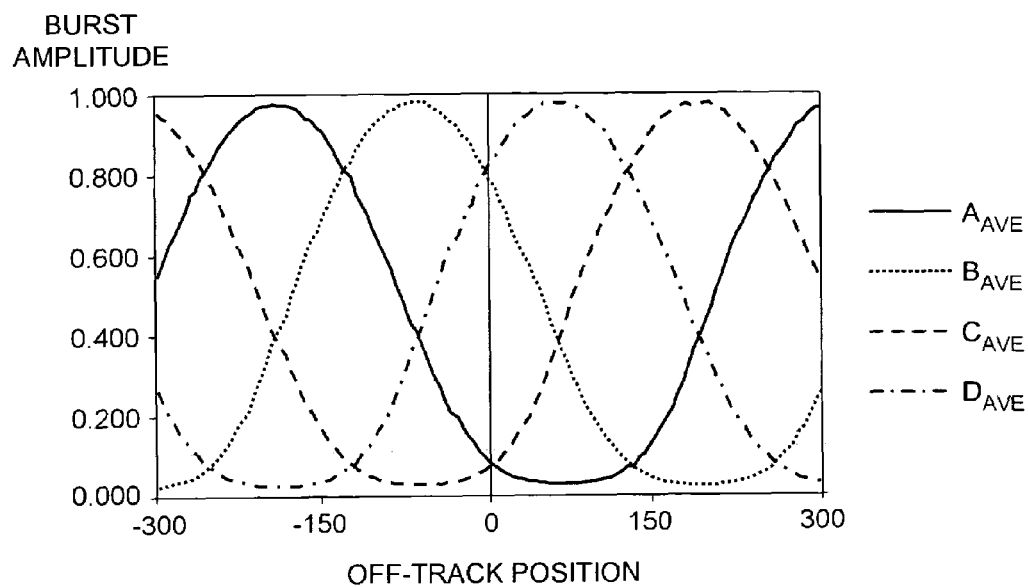
FIG. 5 is a graph of servo burst amplitude versus off-track position for four offset servo bursts.

The RRO compensation value for a servo sector 34 may be calculated based on the burst position error signals (PES) by a formula using either a calibrated table of burst amplitude versus burst position, or using linear approximations. A linear approximation may use the exemplary graph in FIG. 4 of burst amplitude versus burst off-track position. Advantageously, the bursts are each written with an offset with respect to a track center as shown in FIG. 5. The burst's offset may be accounted for to obtain a burst position value $x_i$. For a burst having its width determined by the width of the writer and having its position scaled to 256 counts per track, and the track having a zero count position as shown in FIG. 3, the respective burst position values may be calculated as follows: $x_A=X_A+192$, $x_B=X_B-64$, $x_C=X_C-192$, and $x_D=X_D+64$. The RRO compensation value for the servo sector may be calculated by the formula: RRO= $K(f(x_B)-f(x_D)+f(x_C)-f(x_A))/(f(x_B)+f(x_D)+f(x_C)+f(x_A))$, where K is a calibrated linearity constant and f is the function of burst amplitude versus position as shown in FIG. 4.

With reference again to FIG. 2, the magnetic disk drive 30 has a head disk assembly (HDA) 42 and a servo control system 44. The HDA includes the rotating magnetic disk 28 and an actuator 46 for positioning a transducer head 48 in response to a control effort signal 50. The embedded servo sectors 34 form a plurality of uniformly spaced-apart servo wedges extending radially across the disk surface. The transducer head 48 is for periodically reading the position information from the servo wedges, and for reading data from and writing data to the data storage tracks. The control system 44 includes a sampled servo controller 52, and circuitry and processors that control a head-disk assembly (HDA) 42 and that provide an intelligent interface between a host 54 and the HDA for execution of read and write commands. The sampled servo controller 52 is for periodically adjusting the control effort signal 50 during a track-following operation based on the position information and repeatable runout (RRO) cancellation values. The control system may have an internal microprocessor and nonvolatile memory for implementing the techniques related to the invention. Program code for implementing these techniques may be stored in the nonvolatile memory and transferred to volatile random access memory (RAM) for execution by the microprocessor. The HDA further includes a spindle motor 56, a voice coil motor (VCM) circuit 58 coupled between the actuator 46 and the sampled servo controller 52 of the control system 44, and a preamplifier 60 coupled between the transducer head 24 and the control system 44.

Figure 6:
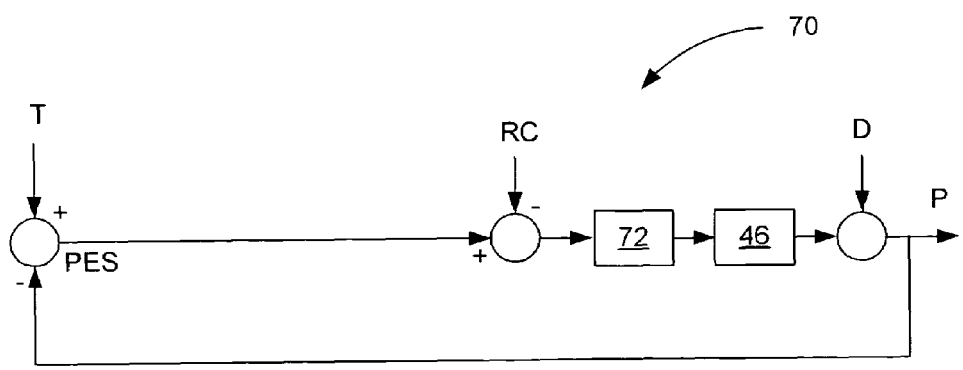
FIG. 6 is a block diagram of a servo control loop, within the disk drive of FIG. 2, for using the RRO cancellation information to reduce the effects of RRO during track following operations.

With reference to FIG. 6, a servo control loop 70, implemented by the sampled servo controller 52, includes the actuator 46 after a track following compensator 72. Disturbances D to the actuator alter the resulting head position P. A track selection signal T is compared to the head position P to generate a position error signal PES. For track following along the circular track 26 during disk operations, the RRO cancellation values RC modify the PES to reduce the effect of the RRO.

Alternatively, the method of the present invention may comprise writing servo burst patterns, A, B, C and D, at a plurality of radial locations on the magnetic data storage surface during circular tracking operations using the spiral servo tracks 32, and storing respective position error signals generated during the circular tracking operations. The servo burst patterns at the plurality of radial locations define a circular data track 26. The RRO compensation value set for the circular data track 26 may be generated based on the respective stored position error signals generated during the circular tracking operations for writing the servo burst patterns at the plurality of radial locations.

What is claimed is:

1. A method for generating a repeatable runout (RRO) compensation value set for a circular data track on a magnetic medium on a surface of a disk in a disk drive, wherein the magnetic medium has a plurality of previously-written spiral servo tracks for providing position information during a circular tracking operation, the method comprising:

writing servo burst patterns at a first radial location on the magnetic data storage surface during a circular tracking operation using the spiral servo tracks, and storing first position error signals generated, using the spiral servo tracks, during the circular tracking operation for writing the servo burst patterns at the first radial location, writing servo burst patterns at a second radial location on the magnetic data storage surface during a circular tracking operation using the spiral servo tracks, and storing second position error signals generated, using the spiral servo tracks, during the circular tracking operation for writing the servo burst patterns at the second radial location, writing servo burst patterns at a third radial location on the magnetic data storage surface during a circular tracking operation using the spiral servo tracks, and storing third position error signals generated, using the spiral servo tracks, during the circular tracking operation for writing the servo burst patterns at the third radial location, writing servo burst patterns at a fourth radial location on the magnetic data storage surface during a circular tracking operation using the spiral servo tracks, and storing fourth position error signals generated, using the spiral servo tracks, during the circular tracking operation for writing the servo burst patterns at the fourth radial location, and generating the RRO compensation value set for a circular data track, defined by the servo burst patterns at the first, second, third and fourth radial locations, based on the stored first, second, third and fourth position error signals.

2. A method for generating a repeatable runout (RRO) compensation value set as defined in claim 1, further comprising using the RRO compensation value set during a track following operation along the circular data track.

3. A method for generating a repeatable runout (RRO) compensation value set as defined in claim 1, wherein the servo burst patterns at the first, second, third and fourth radial locations form a plurality of embedded servo sectors for providing position information during track following along the circular data track.

4. A method for generating a repeatable runout (RRO) compensation value set as defined in claim 3, further comprising:

track following along the circular data track using the RRO compensation value set and determining a position error signal for each servo sector of the circular data track; and determining an improved RRO compensation value for each servo sector based on at least one position error signal determined while track following along the circular data track.

5. A method for generating a repeatable runout (RRO) compensation value set for a circular data track on a magnetic medium on a surface of a disk in a disk drive, wherein the magnetic medium has a plurality of previously-written spiral servo tracks for providing position information during a circular tracking operation, the method comprising:

writing servo burst patterns at a plurality of radial locations on the magnetic data storage surface during circular tracking operations using the spiral servo tracks, and storing respective position error signals generated, using the spiral servo tracks, during the circular tracking operations for writing the servo burst patterns at the plurality of radial locations, wherein the servo burst patterns at the plurality of radial locations define the circular data track; and generating the RRO compensation value set for the circular data track based on the respective stored position error signals generated during the circular tracking operations for writing the servo burst patterns at the plurality of radial locations.

6. A method for generating a repeatable runout (RRO) compensation value set as defined in claim 5, further comprising using the RRO compensation value set during a track following operation along the circular data track.

7. A method for generating a repeatable runout (RRO) compensation value set as defined in claim 5, wherein the servo burst patterns at the plurality of radial locations form a plurality of embedded servo sectors for providing position information during track following along the circular data track.

8. A method for generating a repeatable runout (RRO) compensation value set as defined in claim 7, further comprising:

track following along the circular data track using the RRO compensation value set and determining a position error signal for each servo sector of the circular data track; and determining an improved RRO compensation value for each servo sector based on at least one position error signal determined while track following along the circular data track.

* * * * *